March 25, 1947.  H. F. CLARK  2,417,912

SPLIT-PHASE MOTOR THERMAL STARTING SWITCH

Filed Aug. 31, 1944  4 Sheets-Sheet 1

INVENTOR.
BY Harry F Clark
Spencer Hardman and Fehr
Attorneys

March 25, 1947. H. F. CLARK 2,417,912
SPLIT-PHASE MOTOR THERMAL STARTING SWITCH
Filed Aug. 31, 1944 4 Sheets-Sheet 2

INVENTOR.
Harry F. Clark
BY Spencer Hardman and Fehr
Attorneys

March 25, 1947. H. F. CLARK 2,417,912
SPLIT-PHASE MOTOR THERMAL STARTING SWITCH
Filed Aug. 31, 1944 4 Sheets-Sheet 3

INVENTOR.
BY Harry F Clark
Spencer Hardman and Fehr
Attorneys

Patented Mar. 25, 1947

2,417,912

UNITED STATES PATENT OFFICE 2,417,912

SPLIT-PHASE MOTOR THERMAL STARTING SWITCH

Harry F. Clark, Oakwood, Ohio, assignor to General Motors Corporation, Dayton, Ohio, a corporation of Delaware Application August 31, 1944, Serial No. 552,166

13 Claims. (Cl. 172—279)

1

This invention relates to electrical apparatus and more particularly to motor starting and overload controls for electric motors.

Because of their apparent simplicity, there have been many attempts to provide satisfactory bimetal starting and overload controls for electric motors. One example of such a bimetal starting control is shown in Fig. 2 of the Werner Patent No. 2,117,123. A number of difficulties have prevented the wide use of such a control.

One of the most troublesome factors is the wide range of current values which must be conducted by the starting control. In bimetal starting controls, the motor current is used to first rapidly heat the bimetal operated starting switch until the starting circuit is opened. The motor current must then continue to heat the bimetal operated starting switch to keep the starting circuit open throughout the remainder of the running period of the motor. It is well-known that at the point of use or connection of a device connected to a commercial supply line, the voltage varies widely depending upon the conditions of the system. For example, a nominal 110 volt circuit may deliver current at a voltage of from 90 to 120 or 125 volts.

By testing bimetal starting controls, it has been found that if sufficient heat is provided for the starting control to give proper starting on a 90 volt current supply, that overheating will occur upon a 120 volt supply. Or if the heating is reduced sufficiently to prevent overheating on 120 volts, the heating will be insufficient to cause the bimetal to hold the starting circuit open when the voltage supply drops to 90 volts. Even where the power supply and individual power circuit does not vary to this extent, a manufacturer of starting controls is still confronted with this problem, since the equipment he builds for a nominal 110 volt circuit may be used either upon a power circuit which frequently supplies current at the point of delivery at 90 volts or upon another circuit which may supply current at the point of delivery at 120 or 125 volts. It has, in the past, also been necessary to provide for the manufacture of several different variations of starting controls to accommodate different current frequencies because the power supply in this country employs in different communities, 25, 50 and 60 cycle current. It is therefore desirable that one starting control be provided which will operate satisfactorily upon a wide variation of voltages and frequencies.

Another difficulty with bimetal starting and over-load controls is that the operation varies according to changes in the room or environment temperatures. Still another difficulty is that the overload protector may reset before the starting control resets.

It is an object of my invention to provide a practical bimetal starting control for controlling the energization of the phase winding in which the bimetal will not be overheated under any operating condition.

It is another object of my invention to provide a heating arrangement for a bimetal starting control which will supply sufficient heat to provide proper operation under all expected conditions without supplying excess heating under any conditions.

It is another object of my invention to provide a simple inexpensive starting control in which the timing is kept within a desirable range regardless of the variations in voltage conditions.

It is another object of my invention to provide a starting control which will operate satisfactorily upon current of 25, 50 and 60 cycles.

It is another object of my invention to provide a starting control in which the timing is kept within a desirable range regardless of changes in the room or environment temperature.

It is another object of my invention to provide means employing a motor starting control for keeping the motor overload protector tripping point within a desirable range regardless of the change in the room or environment temperature.

It is another object of my invention to provide a bimetal starting and overload control in which the overload will reset at the same time or earlier than the starting control.

It is another object of my invention to provide an improved support and arrangement of the ends of a bimetal strip.

It is another object of my invention to provide means for reducing the voltage drop and heating produced within an electro-thermal starting control during the starting period of the motor.

It is another object of my invention to provide an electro-thermal starting control with three different heating rates to properly control the operation during the starting and running periods under all conditions without overheating the electro-thermal element.

It is another object of my invention to provide a temperature responsive double throw switch mechanism having a snap action effective only during a portion of its movement.

Generally speaking, these objects are attained by providing a starting control in which the bimetal operated switch is heated to a relatively high temperature by current flowing through the bimetal to open the starting circuit and after this opening, the bimetal is short circuited to reduce the heating thereof, after which the short circuit is opened periodically to supply sufficient heat to the bimetal to keep the starting circuit open during the running period of the motor. The heating of the bimetal produces an amount of heat within the switch casing sufficient to keep the interior at a substantially constant temperature regardless of any change in the environment temperature, so that the tripping time for both the starting and overload controls will not vary materially under different environment conditions. The thermal overload is provided with greater heat storage capacity than the starting control so that the starting control resets before the overload resets.

At least a portion of the bimetal is column loaded to provgide a snap action but the short-circuiting contact is located outside the range of snap action to facilitate periodic opening and closing of the short-circuiting contact during the running period of the motor. An auxiliary contact opened by the initial movement of the bimetal is optional to reduce the rate of heating of the bimetal and the voltage drop through the starting control during the starting period of the motor. The ends of the bimetal preferably are each provided with a 180 degree edgewise turn and anchored.

Further objects and advantages of the present invention will be apparent from the following description, reference being had to the accompanying drawings, wherein a preferred form of the present invention is clearly shown.

Referring now more particularly to Figs. 1 to 7, there is shown a split phase electric motor 20 having a main or running winding 22 and a phase or starting winding 24. This electric motor is supplied with electric energy through the supply conductor 26 which connects to the common junction of the windings 22 and 24 and the supply conductor 28 which connects to the starting and overload control, designated generally by the reference character 30.

The overload protector

The conductor 28 specifically connects to a clip 32 mounted upon the switch mounting base 34 made of some suitable insulating material. This clip supports one end of an electric heater 36, the other end of which is supported by a connector 38 also supported by the base and carrying a stationary contact 40. In engagement with the stationary contact 40 is a movable contact 42 carried by the middle of a column loaded bimetal strip 44 which serves as the actuating bimetal of the overload control. This bimetal strip 44 is supported in notches at its left and right ends which are formed in the arms 46 and 48 of the main bracket 50 which is riveted to the base 34. The bimetal strip 44 has the material of greater expansibility facing the contact 40 so that upon sufficient heating it will move away from the contact 40. The left end of the bracket 50 is provided with an adjusting screw 52 which may be adjusted to provide any desired column loading upon the bimetal strip 44 by engaging and moving the arm 46 in order to vary the contact pressure between the contacts 40 and 42 as well as the differential between the opening and closing of these contacts. This column loading provides a desirable form of snap action of the bimetal strip 44.

The bracket 50 is provided with an ear 54 supporting one end of an electric heater 56 adjacent the right end of the bimetal strip 44. The other end of this electric heater 56 is supported by the right starting relay bracket 58. The heater 56 is located adjacent the bimetal 44 so that upon energization of the heater it will quickly apply its heat to the bimetal 44.

The heater 62

Figures 1, 2:
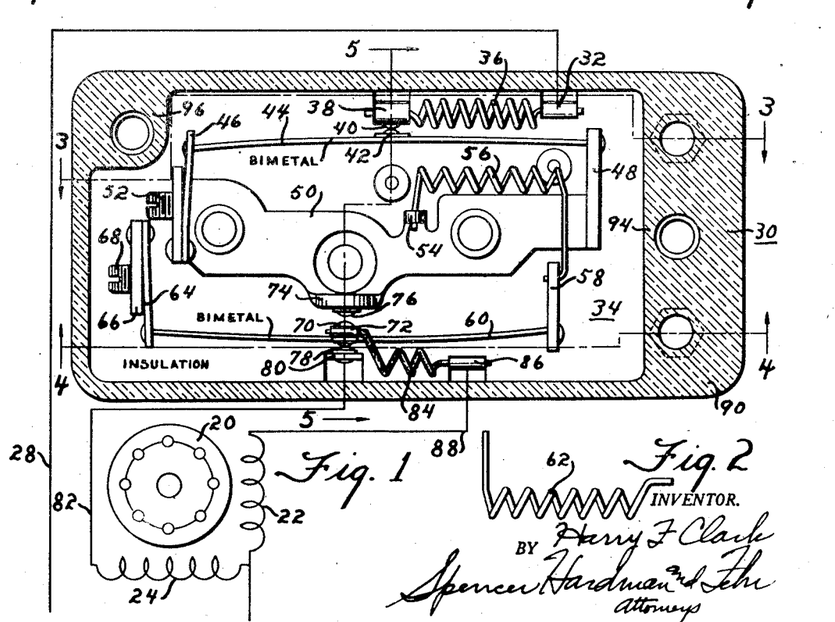
Fig. 1 is a sectional view taken along the line 1—1 of Fig. 3 showing one form of motor control embodying my invention connected diagrammatically to a diagrammatic split phase motor.
Fig. 2 shows a modified form of heating element to replace one of the heating elements shown in Fig. 1.
Figure 3:
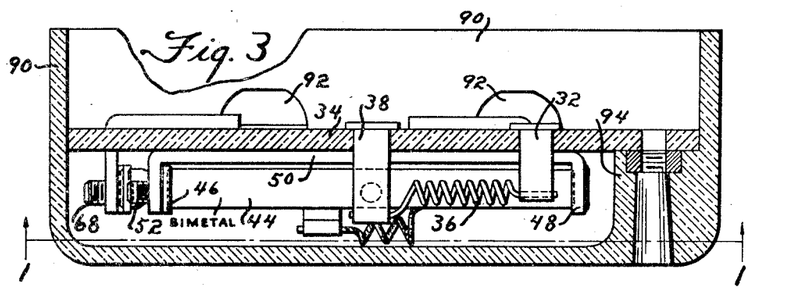
Fig. 3 is a sectional view taken along the line 3—3 of Fig. 1.
Figure 4:
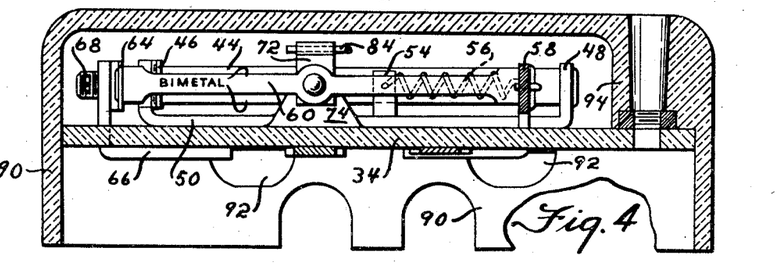
Fig. 4 is a sectional view taken along the lines 4—4 of Fig. 1.
Figure 5:
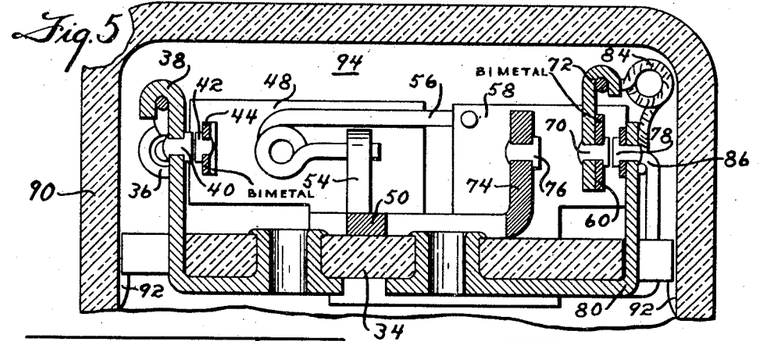
Fig. 5 is an enlarged sectional view taken along the line 5—5 of Fig. 1.

When it is more desirable to apply additional heat to the starting bimetal strip 60, the electric heater 62, in the angular position shown in Fig. 2, may be connected to the ear 54 and the lower starting relay bracket 58 in a manner similar to the heater 56. However, if desired, both heaters may be used simultaneously so as to provide additional heat for both the bimetal strips 44 and 60.

The starting control

The starting bimetal strip 60 is supported at its right end in a notch in the lower starting relay bracket 58 and its left end in a notch in the arm 64 of the left starting relay bracket 66. The arm 64 may be adjusted by the set-screw 68 which engages it to vary the column loading upon the bimetal strip 60. The column loading of the bimetal strip provides a desirable form of snap action, the differential of which is varied by the adjustment of the set-screw 68. At its mid-point the bimetal strip 60 carries a double ended contact 70 extending upon opposite sides of the strip 60. This contact 70 also serves to fasten a pig-tail clip 72 to the strip 60. The main bracket 50 is provided with an up-turned ear 74 carrying a stationary contact 76, called a back contact, which may be engaged by one of the movable contacts 70 when the bimetal 60 is heated sufficiently. The other end of the double ended movable contact 70 is adapted to contact the stationary contact 78 upon the starting connector 80 which is fastened to the base 34 and connected by the conductor 82 to the opposite end of the phase winding 24.

The stationary contact 78 is placed slightly closer to the dead center line of the strip 60 than the back contact 76, so as to get greater contact pressure when the strip 60 is cold and to obtain a better snap action upon the separation of the contacts 70 and 78. The placing of the back contact 76 slightly further away from the dead center line of the strip 60 allows the strip 60 to creep away without snapping over center after being heated and after the contact 70 contacts the contact 76. The material of greater expansibility in the bimetal strip 60 faces the contact 78 causing the strip to move toward the back contact 76 when heated. At room temperature the bimetal strip 60 is bowed when unstressed in the same direction but in a slightly greater amount as in Fig. 1.

The clip 72 supports one end of a flexible electric cable or pig-tail connection 84, the other end of which is connected to the pig-tail supporting clip 86, fastened to the base 34 and connected by the conductor 88 to the other end of the main winding 22. All the elements shown mounted upon the switch mounting base 34 in Fig. 1 are covered by the cover 90, also of insulating material, which slips over the base, as is better shown in Figs. 3 and 4, and is held in place by the bosses or projections 92 formed upon the inside of the side walls of the cover. The cover 90 has sufficient flexibility to allow the insulating base to be pressed into position where it rests between the shoulders 94 and 96 at the corners of the cover and the shoulders on the projections 92 upon the sides of the cover.

Operation

In operation, when the motor 20 is idle and the motor control is at ordinary room temperatures, the bimetals 44 and 60 will assume the position shown in Fig. 1. Under such circumstances electric energy will flow through the conductor 28 to the clip 32, thence through the overload heater 36 to the overload connector 38, through the contacts 40 and 42 and from the contact 42 the current will flow in both directions through the bimetal strip 44 to the arms 46 and 48 of the bracket 50. The current will then flow through the bracket 50 from the arms 46 and 48 to the ear 54, thence through the heater 56 to the right bracket 58 of the starting relay and thence up through the right half of the starting bimetal strip 60 to the contact 70 which is in engagement with the contact 78 from which some of the current flows through the conductor 82 and thence through the phase winding 24 to the other supply conductor 26. In addition, current will flow from the clip 72 through the pig-tail 84 to the pig-tail clip 86 which is connected by the conductor 88 to the main or running winding 22 which is joined to the other supply conductor 26.

The starting bimetal strip 60 has its width reduced to about one-half or one-third the width of the strip 44 so that it will be heated much more rapidly and to a higher temperature by this current flow than the bimetal strip 44. Also, all the current flows through one end of the strip 60 while the current divides in the strip 44 so that one-half of the current flows through each half of the strip 44. Through these measures, the heating effect in the strip 44 is reduced to such a value that it will not trip on a normal starting or running current despite the fact that it is supplied with additional heat by the heaters 36 and 56.

In order to obtain the most powerful starting of a split phase motor it is desirable that the starting winding remain connected until the torque produced by both windings attains its maximum value and becomes less than the torque produced by the running winding alone. It is preferable that the deenergization of the starting winding take place after this speed is reached and before balancing speed is reached. In this control, this is accomplished by selecting the proper width and thickness of the bimetal strip 60, by adjusting the column loading of the bimetal strip 60 through the adjusting screw 68 which bears upon the arm 64, and by properly locating the contacts 76 and 78 relative to the contact 70 so that when this speed range is reached, enough current has flowed through the bottom half of the bimetal strip 60 to heat it sufficiently to snap to the opposite side of its dead center line to cause the contacts 70 and 78 to separate between the speed at which the highest torque is obtained and the balancing speed.

Figure 6:
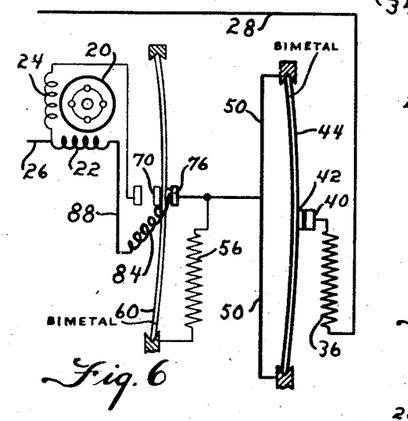
Fig. 6 is a diagrammatic view of the starting control and protector connected to a split phase motor with the energized circuits shown in heavy lines and the others shown in thin lines to illustrate the energization of the circuits when the bimetal starting heat is eliminated.

After thus snapping, the bimetal strip 60 is in the position shown in Fig. 6 wherein the contact 70 engages the contact 76 so as to close a shunt through the bracket 50 which stops the current flow through the bimetal strip 60 and the heater 56 or 62 or both. In this connection, as shown by the current flow in heavy lines in Fig. 6, the current flows through the conductor 28, thence through the overload heater 36 and through the contacts 40 and 42 and thence in opposite directions through the bimetal strip 44 to the main bracket 50 through which it flows directly to the stationary contact 76 and the starting contact 70, thence through the pig-tail 84, the conductor 88, thence through the main winding 22 to the other supply conductor 26. During this time both the bimetal 60 and the heater 56 will cool.

The snap action characteristics of the bimetal 60 and the location of the contact 76 are such that it may creep away from the contact 76 when it is cooled a limited amount without snapping back, so that the starting contact 70 will not immediately reclose with the starting contact 78. As a result, when the bimetal 60 cools, it will creep and assume the position and energize the heavy line circuits shown in Fig. 7. In this condition, neither the contact 78 nor the contact 76 is contacted by the movable starting contact 70. Under these circumstances, current will flow through the supply conductor 28, the overload heater 36, the stationary overload contact 40, the movable overload contact 42 and through the bimetal strip 44 in opposite directions, thence through the main bracket 50 to the heater 56, thence through the heater 56 and the right portion of the bimetal 60 as well as the pig-tail 84, the conductor 88 and the main winding 22 to the supply conductor 26. No current will flow through the phase winding 24 because of the separation of the contacts 70 and 78. The flow of current through the heater 56 and the bimetal 60 set up by the separation of the contacts 78 and 76 raises the temperature of the bimetal 60 and causes it to again contact the back contact 76 to again restore the circuit shown in Fig. 6.

Figure 7:
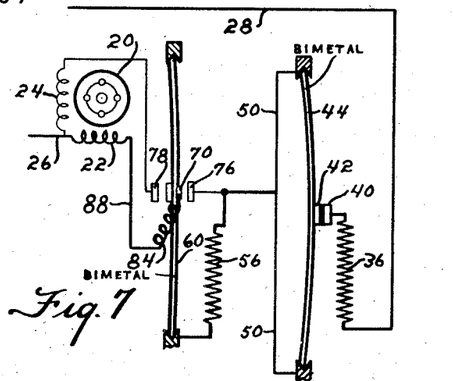
Fig. 7 is a view similar to to Fig. 6 in which the starting bimetal is being instantaneously heated during the running period of the motor.

The restoration of the circuit shown in Fig. 6 will cause the bimetal strip 60 to creep away from the back contact 76 to restore the circuit shown in Fig. 7. The control will then alternate between the circuits shown in Figs. 6 and 7 to supply just enough heat to the bimetal 60 to keep it from returning to the position shown in Fig. 1. While it may at first be considered that this alternation from the circuit shown in Fig. 6 to that shown in Fig. 7 and vice versa would be highly objectionable, this is not true since at all times the voltage difference between the contacts 70 and 76 is very small, because of the small resistance of the bimetal strip 60 and the electric heater 56 which these contacts shunt out.

There is a further advantage in this arrangement. The bimetal strip 60 and the electric heater 56 give off heat to the interior of the cover 90. It is obvious that when the room temperature is low more heating will be required to keep the bimetal strip 60 in its running positions shown in Figs. 6 and 7, and hence the circuit will be arranged as shown in Fig. 7 a proportionately greater part of the time, whereas when the room is warm there will be an increase in the proportion of the time that the circuit is arranged as shown in Fig. 6 wherein no heat is given off by the strip 60 and the heater 56. This heating therefore is substantially in inverse proportion to the room or environment temperature and very nearly compensates for changes in the room or environment temperature so that the temperature within the casing 90 is substantially the same during all periods of operation and this substantially compensates the thermal overload protector and particularly the bimetal strip 44 for changes in environment temperature so that it will trip at substantially the same maximum current value regardless of the changes in room temperature. This effect is slightly increased when the heater 56 is used so that the heat is applied more directly to the strip 44. It so happens, however, that with some motors operating upon abnormally low supply voltages the current flowing through the bimetal strip 60 is insufficient to hold the strip 60 in the position shown in Fig. 7. Under such circumstances the heater 62 may be used either with or without the heater 56, to add to the heating effect flowing through the bimetal strip 60 to hold it in the positions shown in Figs. 7 and 6 during the running period of the motor.

Figure 8:
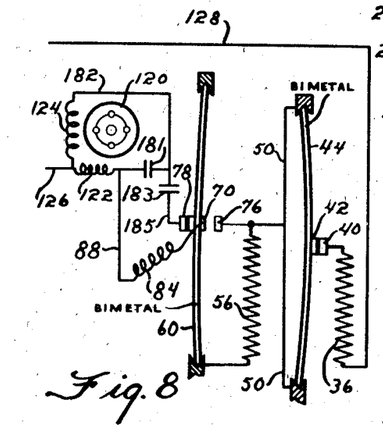
Fig. 8 is a diagrammatic view generally similar to Figs. 6 and 7 but showing the starting control and overload protector connected to a capacitor start and run type of split phase motor.

*Fig. 8*

Figure 9:
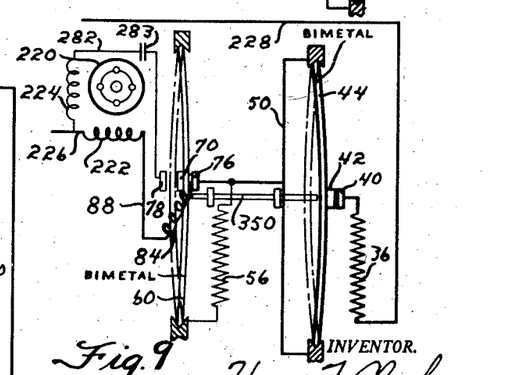
Fig. 9 is a diagrammatic view generally similar to Figs. 6 to 8 but showing the starting and overload control connected to a capacitor start motor and provided with a mechanical connection for resetting the starting control when the overload protector trips.
Figure 10:
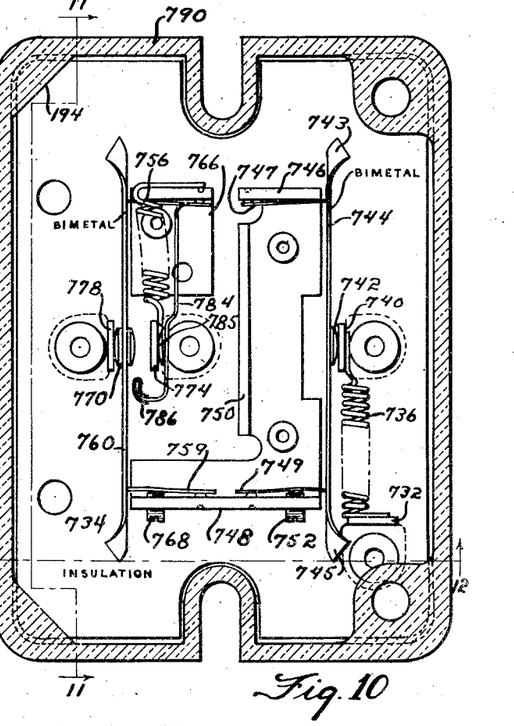
Fig. 10 is a horizontal sectional view taken along the lines 10—10 of Figs. 11 and 12 showing another form of motor control embodying my invention.
Figure 11:
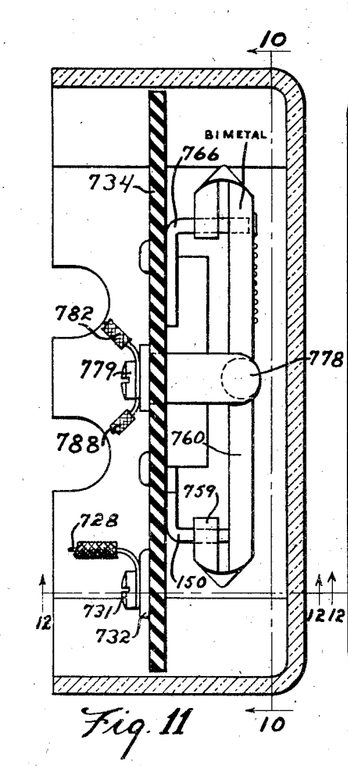
Fig. 11 is a sectional view taken on the line 11—11 of Fig. 10.
Figure 12:
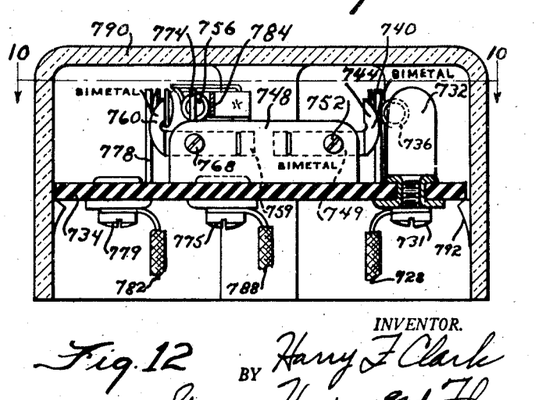
Fig. 12 is a sectional view taken along the line 12—12 of Figs. 10 and 11.

While the control is shown applied to its most common application, namely the inexpensive split phase motor, it may also be used with the more expensive types of split phase motors such as the capacitor start type of split phase motor diagrammatically shown in Fig. 9, and the capacitor start and run motor diagrammatically shown in Fig. 8. In Fig. 8 it will be seen that the starting control is unchanged and includes the overload heater 36 connected to the stationary overload contact 40 which is engaged by the contact 42 carried by the overload bimetal strip 44. This bimetal strip 44 is connected by the bracket 50 to the heater 56 and the back contact 76. The heater 56 is connected to the bimetal 60 which carries the starting contact 70 shown in engagement with the stationary starting contact 78. The movable starting contact 70 is connected by the pig-tail 84 and the conductor 88 to the main winding 122 of the capacitor start and run motor 120. The motor 120, however, is provided with a phase winding 124 which is connected by the conductor 182 to the starting capacitor 183 which in turn is connected by the conductor 185 to the starting contact 78. The conductor 182 is also connected to the running capacitor 181 which is also connected to the conductor 88 so that it is connected at all times between the phase winding 124 and the main winding 122.

With this motor, current is supplied through the supply conductor 128 to the overload heater 36, the overload bimetal strip 44, the heater 56 and the starting bimetal 60 in a manner just as described for Fig. 1. Current also flows through the pig-tail 84 and the conductor 88 to the main winding 122 and also to the running capacitor 181 and through the conductor 182 to the phase winding 124. Current also flows during the starting period from the movable starting contact 70 to the stationary contact 78 and through the conductor 185, the starting capacitor 183 and the conductor 182 to the phase winding 124. This provides the necessary current for the motor 120 to start.

When sufficient current flows through the starting bimetal strip 60, it will trip to place the movable contact 70 in engagement with contact 76 thus shunting the bimetal strip 60 and the heater 56. During the remainder of the running period of the motor, no current will flow through the conductor 185 and the starting capacitor 183 but current will continue to flow through the conductor 88 and through the main winding 122 to the supply conductor 126 and also through the running capacitor 181 and the conductor 182 and the phase winding 124 to the conductor 126. The bimetal 60 will creep away from time to time to separate the contacts 70 and 76 to allow sufficient current to flow through the heater 56 and the bimetal strip 60 to keep the strip 60 upon the right side of its dead center position so that the contact 70 will not re-engage the contact 78 during the remainder of the operation of the motor.

It should be noted that in all the arrangements, overheating of the bimetal strip 60 is prevented since, when sufficient heat to the bimetal strip 60 is supplied to trip it across its dead center position so as to separate the contacts 78 and 70, the back contact 76 is engaged to remove all the heating effect from the bimetal strip 60. In this way previous objections to the bimetal type starting control have been overcome. Sufficient heating effect can always be applied to the bimetal strip 60 to cause it to move from the left to the right side of its dead center position to separate the contact 70 from the contact 78 and to keep them separated throughout the running period of the motor without the danger of applying so much heat that the bimetal 60 will become overheated and lose its temper and get out of calibration.

*Fig. 9*

This is also true where my starting control is applied to a capacitor start motor 220 such as is shown in Fig. 9 having a main winding 222 and a phase winding 224 which is connected by the conductor 282 to a starting capacitor 283 which in turn is connected by the conductor 285 to the stationary starting contact 78. The main winding 222 is connected at one end to the common junction connecting to the supply conductor 226 while the other end is connected by the conductor 88 to the pig-tail 84 just like the connections shown in Figs. 1 to 7. The other supply conductor 228 is connected to the overload heater 36 which is connected to the stationary contact 40 contacted by the movable contact 42 of the overload bimetal strip 44 which is connected by the bracket 50 to the back contact 76 and the heater 56 which connects to the starting bimetal strip 60 provided with the movable starting contact 70.

Thus, the capacitor start motor may be controlled by the same control shown specifically in Figs. 1 to 5 and illustrated diagrammatically in Figs. 6 to 8. In all of these controls, the overload bimetal strip 44 is provided with a sufficient heat storage capacity and a sufficiently large differential so that when it trips open it will remain open at least a sufficient length of time to allow the starting bimetal strip 60 to cool and return to the starting position shown in Fig. 1. If it is not desired to rely upon this arrangement, a simple mechanical means may be used to positively throw the starting bimetal strip 60 back to its starting position shown in Fig. 1 when the overload bimetal strip 44 moves to the open circuit position. In Fig. 9 such a connection is shown. In this figure, a rod 350 of insulating material is slidably mounted in a pair of ears. The rod 350 is just long enough so that when the overload bimetal strip 44 snaps across its dead center position to the dot and dash line position shown in Fig. 9 the other end will engage the bimetal 60 to move it across its dead center position to the dot and dash line position where the movable starting contact 70 will engage the stationary contact 78. The rod 350 will continue to hold the starting bimetal strip 60 in this position until the overload bimetal 44 resets. During this time, the starting bimetal strip 60 will cool and the snap action characteristics of the starting bimetal strip 60 can be depended upon to retain the starting bimetal strip 60 in this position for the starting of the motor which will follow instantly upon the reclosing of the overload protector.

SECOND FORM

Referring now more particularly to Figs. 10 to 16, there is shown an electric motor 720 having a main or running winding 722 and a phase or starting winding 724. This electric motor 720 is supplied with electric energy through the supply conductor 726 which connects to the common junction of the windings 722 and 724, and the supply conductor 728 which connects to the starting and overload control designated generally by the reference character 730. In order to provide a greater starting torque, the phase winding 724 is shown connected by the conductor 783 to a condenser or starting capacitor 725 to make the motor a capacitor start motor. However, if high starting torque is not required this starting capacitor 725 may be omitted. When so omitted, the motor 720 is an ordinary split phase motor.

*The overload protector*

The conductor 728 specifically connects to an L-shaped mounting bracket 732 having its lower portion beneath the switch mounting base 734. This lower portion is riveted to the base 734 by a hollow rivet which is threaded to receive the fastening screw 731 which fastens the supply conductor 728 to the bottom of this L-shaped mounting bracket 732. The upper portion of the L-shaped mounting bracket 732 extends upwardly through a slot in the switch mounting base 734 and to it is fastened by welding or soldering one end of a coiled electric heater 736. The other end of the electric heater is supported by an L-shaped stationary contact 740 which extends through the base 734 and is riveted thereto. In engagement with the stationary contact 740 is a movable contact 742 carried by the middle of a column loaded bimetal strip 744 which serves as the actuating bimetal of the overload control. The stationary contact 740 is so located that when engaged by the movable contact 742, the bimetal strip will be held substantially straight.

In Figs. 1 to 9 the bimetal strips are shown supported on knife edges with the current flowing from the ends of the strip to the supporting knife edges. This arrangement may, under some circumstances, cause corrosion at the ends of the bimetal, which would affect operation of the control. To avoid this possibility, the ends of the bimetal strip in this second form, are welded to the ends of the main bracket 750. However, if the ends of the bimetal strip were connected directly to this main bracket 750 without a bend or merely by simple bends, the effect of temperature upon these ends would be opposite to the bowing of the midpoint of the bimetal strip 744 under an increasing temperature. That is, when the bimetal 744 would tend to bow to the right at its midportion the plain anchored ends of the strip would tend to bend clockwise at the top and counter-clockwise at the bottom so as to force the midpoint of the bimetal strip 744 to the left. In order to prevent this opposition and to make both effects supplement each other, I provide edgewise bends 743 and 745 through an angle of 180 degrees at each end of the strip 744 and bend each of these turned portions at right angles and weld their ends 747 and 749 to projections formed on the up-turned ends 746 and 748 of the main bracket 750. This causes the bimetal ends to accentuate the bowing of the midportion of the strip 744 by bending counter-clockwise at the top and clockwise at the bottom, and this makes it possible to make the control smaller.

The up-turned end 748 is provided with an adjusting screw 752 which may be adjusted to provide any desired column loading upon the bimetal strip 744 by engaging the welded right angled portion 749 of the strip 744. In this column loading, the right angled portion 749 acts as a compound cantilever spring for applying the column loading in direct alignment with the strip 744 when in the closed position. This column loading insures a snap opening and closing of these contacts which can be separately adjusted. The adjustment provided by the screw 752 varies the force required to close the overload contacts 742 and 740. This force is obtained by the cooling of the bimetal and thus the adjusting screw 752 may be set to vary the closing temperature of the overload contacts. The opening of the contacts is adjusted by moving the stationary contact 740 toward or away from the strip 744. Moving the contact 740 toward the strip 744 will reduce the contact opening temperature while moving the contact 740 away from the strip 744 will increase the contact opening temperature. The width, thickness and length of the bimetal strip 744 and the resistance of the auxiliary heater 736 may be varied to provide the proper overload characteristics for different motors.

The starting control

The bracket 750 is riveted to the switch mounting base 734 and provided with a longitudinal stiffening rib. The turned up end 748 supports the lower end of the starting bimetal strip 760 which like the overload bimetal strip 744 has its end portions turned edgewise 180 degrees and then at right angles for similar reasons. The end of the lower right angled portion 759 is welded to the turned up portion 748 and is provided with a set-screw 768 for applying a resilient column loading to the strip 760 in which the right angled portion 759 acts as a compound cantilever spring which applies the column loading in substantially direct alignment with the strip 760 when in contact with the starting contact 778. At the upper end of the strip 760 the right angled end portion is welded to a projection on the turned up portion of a separate bracket 766 likewise riveted to the switch mounting base 734. At its midpoint the starting bimetal strip 760 carries a double-ended contact 770 which when the strip 760 is cool engages with considerable contact pressure, the starting contact member 778 which is in the form of an L-shaped bracket extending beneath the switch mounting base 734 and is riveted thereto. The starting contact member 778 is so located that when it is engaged by the double-ended contact 770 the starting bimetal strip 760 is held substantially straight. This starting contact bracket is provided with a binding screw 779 which connects to the conductor 782 connecting the contact 778 with the phase winding circuit.

The auxiliary heater and contact mechanism

Connected to the bracket 756 is one end of an electric heater 756 which extends alongside the starting bimetal strip 760 and has its other end fastened to the L-shaped back contact member 774 which extends through the switch mounting base 734 and is riveted thereto. On its bottom face it is provided with a binding screw 775 which connects this back contact member with the conductor 788 of the main winding circuit.

The bracket 766 is also shown provided with an auxiliary contact member 784 in the form of a cantilever spring provided with an auxiliary contact 785 for engagement with the back of the back contact 774. The end of this auxiliary contact member 784 is curled and covered with insulation 786 which places it just out of contact with the bimetal strip 760. The switch mounting base 734 is preferably of some suitable electrical insulating material and is preferably mounted within a casing 790 likewise of insulating material and held in place against the shoulders 794 provided in the corners by the projections 792 provided upon the sides of the case.

Current flow in the second form

Figures 14, 15:
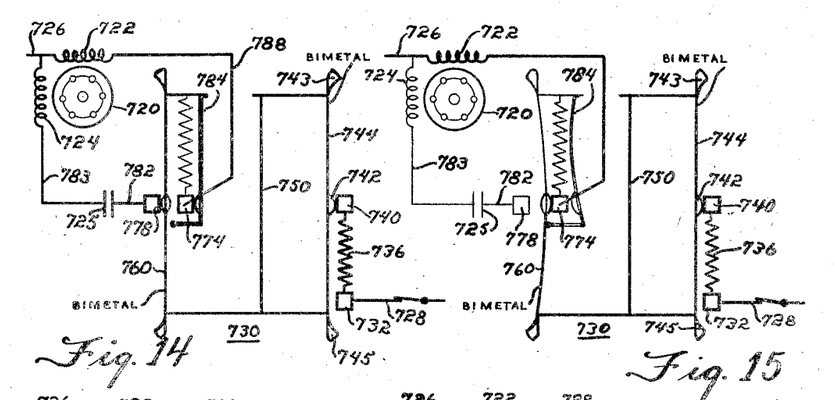
Fig. 14 is a wiring diagram of the motor and control system connected for the starting of the motor in which the energized portions are indicated by heavy lines and the deenergized portions by light lines.
Fig. 15 is a wiring diagram similar to Fig. 14 showing the changed connections at the completion of the starting period.

With this arrangement when the motor 720 is first connected to the power line, as illustrated by the heavy lines in Fig. 14, current will flow from the supply conductor 728 to the bracket 732, thence through the heater 736 alongside the overload bimetal strip 744 to the stationary contact 740 and the movable contact 742. From this point the current will divide and flow in opposite directions throughout the overload bimetal strip 744 until it reaches the points at which it is welded to the projections extending from the upturned ends 746 and 748 of the main bracket 750. The characteristics of the heater 736 and the characteristics and adjustment of the bimetal strip 744 will determine the current values which will cause the overload bimetal 744 to trip open to deenergize the motor upon an overload. The column load imposed by the set-screw 752 will determine the temperature to which the overload bimetal strip 744 will fall and thus the resetting time before it will snap to its closed position. This resetting time must be made longer than the resetting time of the starting bimetal strip 760. By arranging the contacts so that the overload bimetal strip 744 is held straight when closed, the tripping current and the resetting time and temperature can be separately adjusted.

From the ends of the overload bimetal strip 744, the current will flow through the main bracket to the point at which right angled portion 759 of the starting bimetal 760 is welded to the weld projection provided on the up-turned end 748. All this current will then pass upwardly through the lower portion of the starting bimetal strip to the double contact 770 at its midpoint. There more than half the current will flow through the contacts 770 and 778 to the starting winding circuit including the conductor 782, the capacitor 725 and the starting winding 724 to the supply conductor 726. The remainder of the current will flow through the upper portion of the starting bimetal strip 760 to the bracket 766 and thence through the auxiliary contact member 784 and its contact 785 to the back contact 774 which connects to the main winding circuit including the conductor 788 and the main winding 722 which connects to the supply conductor 776.

Operation of the second form

Upon the initial starting of the motor, the bimetals 744 and 760 will be at room temperature and the control will be in the positions shown in Figs. 10 to 12 and 14. This is indicated by the point 820 upon the diagram shown in Fig. 19. Although it is held substantially straight by the starting contact 778, at room temperature the starting bimetal strip 760 tends to bow to the left so as to press tightly against the starting contact 778 with a pressure of more than 3 oz. The flow of current through this starting bimetal strip will gradually raise its temperature as illustrated by the vertical line extending up from the point 820 to cause it to rapidly reduce its tendency to bow to the left. The starting bimetal strip 760 is of such thickness, width and initial curvature that at the most desirable time for terminating the starting period it will become straight. When the temperature gets so high that the pressure against the starting contact 778 reaches zero, the starting bimetal strip 760 will snap and bow to the right to the position shown in Fig. 15. This snapping or tripping temperature is indicated by reference character 822 in Fig. 19, and the movement of the contacts 770 at this temperature is designated by the horizontal line connecting point 822 and the point 824. This snapping or tripping temperature may be raised or lowered by bending the starting contact 778 away or toward the starting bimetal strip 760, thus increasing or reducing the length of the starting period. By arranging the starting contact 778 so that the strip 760 is held substantially straight during the starting period, there is substantially no resistance to leaving the starting contact 778, and less heating of the bimetal strip 760 is required and a heavier bimetal material may be used. It also reduces the energy consumed by the starting control during the starting period as well as during the running period, thus increasing the net amount available for the motor.

Figure 13:
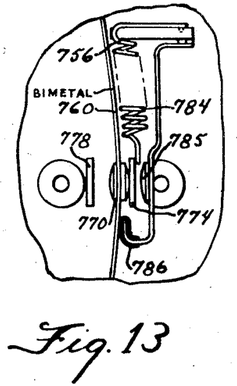
Fig. 13 is a fragmentary plan view of a detail of Fig. 10.

At an intermediate point, 825, in this movement the insulated end 786 of the auxiliary contact member 784 is contacted by the adjacent portion of the bimetal strip 760 to carry the auxiliary contact member 784 with it to move the auxiliary contact 785 away from the back contact 774 as shown in Figs. 13 and 15. This point 825 should be well within the snap action range of the strip 760 and may be set by varying the bend or curl at the insulated end of the auxiliary contact member 760. Prior to this time, that is, between the points 820 and 822 in Fig. 19, the auxiliary contact member 784 has had its contact 785 in contact with the rear face of the back contact 774, thereby shunting the external heater 756 and as a result the action of the bimetal strip 760 has been due entirely to the current flowing through it. After the point 825 is passed the auxiliary contact member 785 remains open and instead of flowing from the bracket 766 through the auxiliary contact member 784, the main winding current flows from the bracket 766 through the heater 756 to the back contact 774.

This heating, however, is only momentary and of no importance at this time, since the bimetal is travelling rapidly under the force of the snap action column loading and reaches the back contact 774 without a pause. The column loading of the bimetal strip 760 is such that at the tripping temperature indicated by the horizontal line 822 to 824, the contact 770 will just be in contact with the back contact 774 without any contact pressure. In action, however, due to inertia the contact 778 will strike the back contact 774 with considerable force. This immediately shunts both the heater 756 and the upper half of the starting bimetal 760. The main winding current flowing through the lower half of the starting bimetal 760 to the back contact 774 is insufficient to prevent the bimetal 760 from cooling slowly but it is sufficient to prevent rapid cooling. This causes the bimetal 760 to gradually creep away from the back contact 774 to the position illustrated in Fig. 16.

Figures 18, 19:
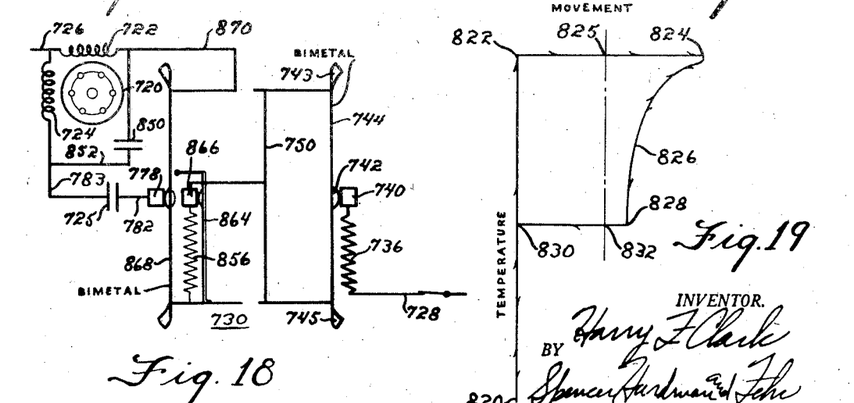
Fig. 18 is a wiring diagram showing a modified arrangement of the control likewise connected to a capacitor start and run motor in starting position.
Fig. 19 is a temperature-movement diagram of the starting bimetal illustrating the movement of the starting contact with the rise and fall in the temperature of the bimetal.

In creeping away from the back contact 774, the movement is opposed by the gradually increasing resistance due to the column loading of the bimetal strip 760. This movement, however, is beyond the snap action range and is represented by the curve between the points 824 and 826 in Fig. 19, which shows that as the temperature falls, the movement becomes less due to this increasing resistance. However, as soon as the bimetal contact 770 leaves the back contact 774 the shunt for the heater 756 and the upper portion of the bimetal strip 760 is opened and current again flows through the upper portion of the strip 760 and the heater 756. This heat is sufficient to slow down the movement of the strip 760 and to stop it and reverse its movement so that it again moves into contact with the back contact 774. This reversal takes place at some point on the curve between the points 824 and 826 in Fig. 19. The point of reversal is now fixed but depends somewhat upon the environment temperature which governs the rate of cooling of the upper portion of the bimetal and the heater 756 as well as the speed at which the temperature is restored. This contacting of the contact 770 with the back contact 774 and the subsequent creeping away and again contacting the back contact takes place repeatedly during the normal running period of the motor. In Fig. 19 this is represented by repeated movements from the point 824 downwardly a variable distance along the line toward the point 826. It is through this cycling on the back contact that the temperature of the bimetal 760 is kept substantially constant during the normal running period and is prevented from overheating. The resetting time of the starting bimetal strip 760 is regulated by this cycling temperature. This cycling temperature may be raised or lowered by bending the back contact 774 away or toward the strip 760 or by increasing or reducing the column loading by adjusting the setscrew 768 or both. It also is provided through this means with sufficient heat to prevent it from snapping back to the starting position. This cycling on the back contact takes place outside of the snap action range provided by the column loading of the strip 760. During all of this cycling the auxiliary contact 785 is held away from the back contact 774 because the bimetal strip 760 is beyond the snap action range and beyond the zone at which the auxiliary contacts are permitted to close. The cycling on the back contact provides thermostatically controlled heating of the interior of the case 790 so as to reduce the variations in the temperature therein due to changes in room temperature.

When the motor circuit is opened to shut off the motor, the bimetals and heaters will cool. In cooling, the bimetal 760 will reach the point of maximum resistance of the snap-acting column loading applied to it immediately after it passes in cooling below the point 826 in Fig. 19. It will cool without much movement until it cools to the point designated by the reference character 828 where it enters the snap action zone or range of movement. Upon passing this point, without any appreciable cooling, the bimetal strip 760 will snap immediately into contact with the starting contact 778. This movement is designated by the horizontal line extending from the point 828 to the point 830 located on the vertical line between the points 820 and 822. As the bimetal strip 760 snaps to its initial position, as illustrated by Fig. 14, the point 832 in Fig. 19 will be crossed. This is the point at which the auxiliary contact 785 again makes contact with the back contact 774 and it is also the point at which the bimetal strip 760 becomes separated from the insulated end 786 of the auxiliary contact arm 784.

Should there be an excessive current flow through the circuit the starting bimetal strip 760 will cycle normally on the back contact thereby limiting its temperature until the thermal overload bimetal strip 749 is heated to its tripping point and snaps open. Since the temperature of the starting bimetal strip 760 is quite accurately controlled and therefore its resetting time is quite definite, the set-screw 750 can be accurately set so as to apply a column loading to the thermal overload bimetal strip 749 which will insure that the overload contacts will not close until the starting bimetal strip 760 has reset to its initial position.

Where extreme environment temperature changes, and particularly extremely low temperatures, are not encountered the auxiliary contact mechanism may be eliminated and the resistance of the heater 756 may be reduced by about one half. This simplifies the mechanism although it adds the resistance of the heater 756 to the resistance of the main winding circuit during the starting period of the motor.

Figures 16, 17:
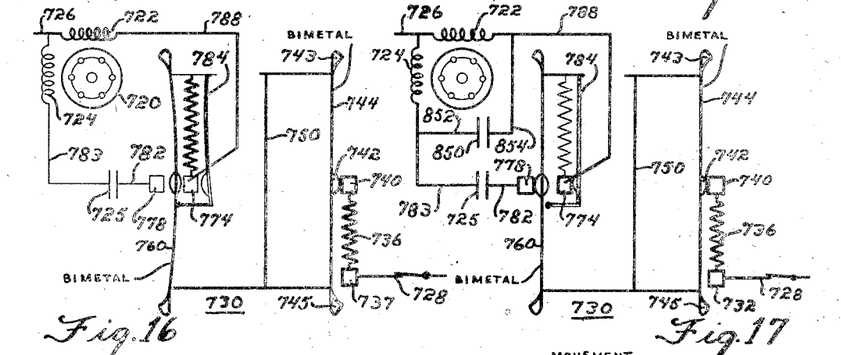
Fig. 16 is a wiring diagram similar to Figs. 14 and 15 showing the other form of connection assumed intermittently during the running period.
Fig. 17 is a wiring diagram showing the control connected to a capacitor start and run motor in starting position.

This control may also be used in the same way where a capacitor start and run motor by adding a running capacitor 850 as shown in Fig. 17 and connecting it by the conductors 852 and 854 to the conductors 783 and 788 of the starting and running winding circuits. The bimetal strips and the heaters of course must be adjusted in size and position in order to conform to the changed current values inherent in the different types and sizes of the split phase motors.

The auxiliary contact mechanism may also be applied to the control of the type shown in Figs. 1 to 9 wherein the auxiliary heater 56 or 62 is in series with the total motor current. In such an arrangement the auxiliary contact mechanism is even more advantageous since the auxiliary heaters either 56 or 62 impose a considerable resistance in series with both the starting and running winding circuits which is mildly objectionable. This arrangement may be used for a capacitor start capacitor run motor as shown in Fig. 18, or the running capacitor 850 may be omitted to make the motor a capacitor start motor, or both the running capacitor 850 and the starting capacitor 725 may be omitted to make the motor a simple split phase motor. In this arrangement, the auxiliary contact member 864 shunts out, during the starting period, the auxiliary heater 856 which extends from the back contact 866 to the bottom of the starting bimetal strip 868. The main winding current flows through the upper half of the starting bimetal strip 868 and its anchorage to the main winding circuit 870 instead of employing the pig-tail 84.

This application is a continuation-in-part of my copending application Serial No. 473,892, filed January 29, 1943.

While the form of embodiment of the invention as herein disclosed, constitutes a preferred form, it is to be understood that other forms might be adopted, as may come within the scope of the claims which follow.

What is claimed is as follows:

1. A control device for an electric motor having main and phase windings, comprising a thermally responsive element having a portion movable in a first direction upon heating and a second direction upon cooling, said element being provided with a snap action throughout a certain range of its movement, means for heating said element by current flowing through said motor to cause said element to move in said first direction through said snap action range and beyond, means responsive to said movement for changing the energization of said phase winding and reducing the heating of said element but maintaining sufficient heating at a second rate of said element during the energization of the motor to cause it to move in said first direction beyond said snap action range, means responsive to a predetermined movement of said element in said first direction beyond said snap action range for further reducing the heating of said element to such an extent that the remainder is insufficient to prevent the element from cooling and moving in the second direction, and means responsive to the movement of said element in said second direction for restoring the heating of said element at said second rate, said further reduced heating rate being sufficient to prevent rapid movement in the second direction so that the restoration of the heating at the second rate will reverse the movement of the element before it passes through the snap acting range.

2. A control device for an electric motor having main and phase windings, comprising a snap acting thermally responsive device having a portion movable in a first direction upon heating and a second direction upon cooling, said device being provided with a snap action throughout a certain range of its movement, a first contact means connected to and operated to closed position by said device when said device moves within said range a predetermined distance in the second direction and movable to open position when said device moves within said range a predetermined distance in said first direction, a second contact means connected to and operated to closed position by said device when said device moves within a limited range beyond said snap action range in said first direction to the limit of said limited range and operated to open position by said device when said device moves in said second direction away from said limit, said first contact means being electrically connected to the phase winding to control its energization, means for heating said device by current flowing through said motor, and means controlled by said second contact means for reducing and restoring said heating when said second contact means is closed and opened but maintaining sufficient heating to prevent said device from passing through said snap action range to close said first set of contacts.

3. A control device for an electric motor having main and phase windings comprising a first contact device connected to the phase winding for controlling its energization, a thermally responsive element operably connected to said first contact device, said element being arranged to move the contacts open upon heating and closed upon cooling, means for causing said element to move with a snap action during the opening and closing of said contacts over a limited range of movement, means for heating said element sufficiently in response to current-flow through the motor to open said contacts at the end of the starting period and to move in a first direction through and beyond said snap acting range, and means responsive to the movement of said element in said first direction to a position beyond said snap acting range for reducing while in said position the heating of said element and yet retain sufficient reduced heating so that the element will slowly cool and move away from said position in the opposite direction.

4. In combination with an electric motor having main and phase windings, a control device including a stationary contact connected to the phase winding, a snap acting thermally operated device provided with a contact means adapted when cool to make contact with said stationary contact and to separate the contact means and the stationary contact when heated, said thermally operated device having a limited snap acting range of movement, means responsive to the initial flow of current through the motor for heating said thermally operated device at a rate sufficient to cause it to separate with a snap action the contact means from the stationary contact at the end of the starting period and to cause it to move in one direction beyond the snap action range, and means for slowly vibrating said thermally operated device within a limited range beyond the snap action range including means for intermittently momentarily reducing the heating of said thermally operated device to an amount sufficient to cause it to move in the opposite direction when it reaches the limit of said limited range, said reduced amount of heating being sufficient to prevent the thermally operated device from returning the contact device to contact with the stationary contact before sufficient heating at the higher heating rate again reverses its direction of movement.

5. A control adapted to change the circuit connections of the phase winding of an electric motor having main and phase windings, a snap acting thermally operated device operable between two extreme positions on opposite sides of a snapping position to operate said control device and normally biased to one of its extreme positions wherein it closes the control device, means responsive to the initial flow of current through the motor for heating the thermally operated device for causing after a predetermined lapse of time the thermally operated device to snap from said one extreme position through its snapping range and to move beyond said range, and means for slowly vibrating said thermally operated device between said snapping range and its other extreme position including means for intermittently momentarily reducing sufficiently the heating of said thermally operated device when it reaches said other extreme position to cause it to move in the opposite direction.

6. A control for controlling the circuit connections of the phase winding of an electric motor having main and phase windings comprising a column loaded bimetal strip portion having a snap acting range and adapted to move in one direction when heated and in the opposite direction when cooled, a normally stationary contact connected to said phase winding located in that portion of the snap action range to which the strip portion moves when cool for closing the circuit between it and a portion of the bimetal, a second normally stationary contact connected to said main winding located beyond that portion of the snap action range to which the bimetal strip portion moves when heated for closing the circuit between it and said bimetal strip portion, two separate points of said strip portion being connected to the main winding and one side of the power supply.

7. A control for controlling the circuit connections of the phase winding of an electric motor having main and phase windings comprising a column loaded bimetal strip portion having a snap acting range and adapted to move in one direction when heated and in the opposite direction when cooled, a normally stationary contact connected to said phase winding located in that portion of the snap action range to which the strip portion moves when cool for closing the circuit between it and a portion of the bimetal, means for heating said strip portion in accordance with the current flowing through the motor and for supplying current to said strip, and means including a second normally stationary contact located beyond that portion of the snap action range to which the bimetal strip portion moves when heated for reducing said heating sufficiently to prevent said strip portion from being overheated.

8. In combination, a column loaded bimetal strip portion having a limited snap action range of movement, contact means carried by said strip portion, a first normally stationary contact located to stop said contact means at a position to stop said strip portion within said snap acting range upon cooling, a second normally stationary contact located upon the opposite side of said strip portion to stop said contact means at a position to stop said strip portion beyond said snap action range upon heating, an electric heater extending along said strip between said second contact and an end portion of said strip portion, an electric motor having main and phase windings, said second contact being provided with a connection, said strip portion being provided with a connection spaced from said end portion, one of said connections being connected to the main winding, and the other being connected to one side of the single phase supply source, said first contact being provided with a connection with the phase winding.

9. In combination, a column loaded bimetal strip portion having a limited snap action range of movement, contact means carried by said strip portion, a first normally stationary contact located to stop said contact means at a position to stop said strip portion within said snap acting range upon cooling, a second normally stationary contact located upon the opposite side of said strip portion to stop said contact means at a position to stop said strip portion beyond said snap action range upon heating, an electric heater extending along said strip between said second contact and an end portion of said strip portion, an electric motor having main and phase windings, said second contact being provided with a connection, said strip portion being provided with a connection spaced from said end portion, one of said connections being connected to the main winding and the other being connected to one side of the single phase supply source, said first contact being provided with a connection with the phase winding, and means for shunting said electric heater when said contact means is in contact with said first contact and for opening the shunt whenever the contact means is separated a predetermined distance from said first contact.

10. A control for controlling the circuit connections of the phase winding of an electric motor having main and phase windings comprising a bimetal strip portion adapted to move in a first direction when cooling and in a second direction when heating, a normally stationary contact connected to said phase winding so positioned as to stop the movement of said strip portion in said first direction when said strip portion is substantially straight, means for applying a column loading to said strip portion substantially in direct alignment with said strip portion when it is straight and in contact with said contact for providing a snap movement away from said contact substantially without opposition from the column loading, means for heating said strip portion in accordance with the current flowing through the motor and for supplying current to said strip, and means including a second normally stationary contact so positioned as to stop the movement of said strip portion in said second direction when said strip portion is curved a predetermined amount for reducing said heating sufficiently to prevent the overheating of said strip.

11. In combination with an electric motor having main and phase windings with one end of each connected to one side of a power source, a control device including a stationary contact connected to the phase winding, a column loaded snap acting bimetal strip portion having a movable intermediate portion between the points of application of the column loading carrying a contact movable with it, said movable intermediate portion being adapted when cool to move said movable contact into engagement with said stationary contact, a second stationary contact so located upon the opposite side of the bimetal strip portion from said first stationary contact that it is contacted by the movable contact when the column loaded strip portion is heated and bows to a predetermined degree, conductor means connecting one end portion of the column loaded strip portion to the other end of the main winding and the other end portion of the strip portion to the other side of the power source, and electrical heating means electrically connecting the second stationary contact to one of the end portions of said column loaded strip portion for heating said strip portion.

12. In combination with an electric motor having main and phase windings with one end of each connected to one side of a power source, a control device including a stationary contact connected to the phase winding, a column loaded snap acting bimetal strip portion having a movable intermediate portion between the points of application of the column loading carrying a contact movable with it, said movable intermediate portion being adapted when cool to move said movable contact into engagement with said stationary contact, a second stationary contact so located upon the opposite side of the bimetal strip portion from said first stationary contact that it is contacted by the movable contact when the column loaded strip portion is heated and bows to a predetermined degree, conductor means connecting one end portion of the column loaded strip portion to the other end of the main winding and the other end portion of the strip portion to the other side of the power source, and conductor means electrically connecting the second stationary contact to said other end of the main winding.

13. In combination with an electric motor having main and phase windings with one end of each connected to one side of a power source, a control device including a stationary contact connected to the phase winding, a column loaded snap acting bimetal strip portion having a movable intermediate portion between the points of application of the column loading carrying a contact movable with it, said movable intermediate portion being adapted when cool to move said movable contact into engagement with said stationary contact, a second stationary contact so located upon the opposite side of the bimetal strip portion from said first stationary contact that it is contacted by the movable contact when the column loaded strip portion is heated and bows to a predetermined degree, conductor means connecting one point upon the column loaded strip portion to the other end of the main winding and another point upon the strip portion to the other side of the power source, and conductor means electrically connecting the second stationary contact to one of said points.

HARRY F. CLARK.

REFERENCES CITED

The following references are of record in the file of this patent:

UNITED STATES PATENTS

| Number | Name | Date |
| --- | --- | --- |
| 1,830,578 | Vaughan | Nov. 3, 1931 |
| 2,133,309 | Schmidinger | Oct. 18, 1938 |
| 2,177,671 | Schmidinger | Oct. 31, 1939 |
| 2,095,579 | Werner | Oct. 12, 1937 |
| 2,132,888 | Werner | Oct. 11, 1938 |
| 2,158,288 | Kuhn | May 16, 1939 |
| 2,175,032 | Schaefer | Oct. 3, 1939 |